June 24, 1958 L. W. SHUTTS ET AL 2,839,894
SUPPORTING ARRANGEMENT FOR A GAS TURBINE COMBUSTION CHAMBER
Filed Dec. 31, 1952 4 Sheets-Sheet 1

Inventors
Leroy W. Shutts &
Charles F. Hayes
By Willis, Helmig & Baillio
Attorneys Inventors
Leroy W. Shutts &
Charles F. Hayes
By Willits, Helwig & Baillie
Attorneys June 24, 1958 L. W. SHUTTS ET AL 2,839,894
SUPPORTING ARRANGEMENT FOR A GAS TURBINE COMBUSTION CHAMBER
Filed Dec. 31, 1952 4 Sheets-Sheet 3

Inventors
Leroy W. Shutts &
Charles F. Hayes
By Willits, Helmig & Baillio
Attorneys

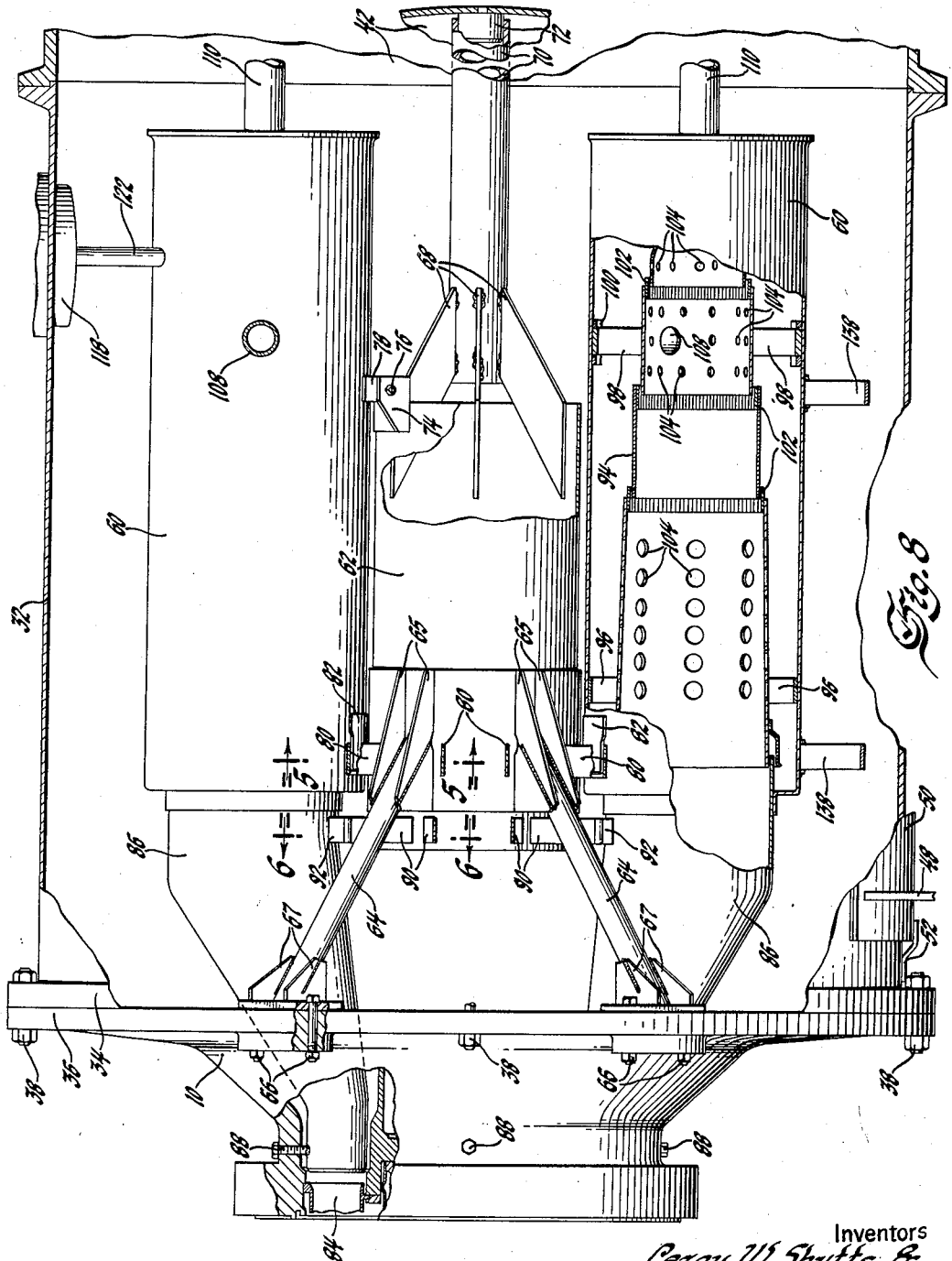

United States Patent Office 2,839,894
Patented June 24, 1958

2,839,894

SUPPORTING ARRANGEMENT FOR A GAS TURBINE COMBUSTION CHAMBER

Leroy W. Shutts and Charles F. Hayes, Indianapolis, Ind., assignors to General Motors Corporation, Detroit, Mich., a corporation of Delaware Application December 31, 1952, Serial No. 328,906

16 Claims. (Cl. 60—39.31)

This invention relates to gas turbine power plants and more particularly to a combustion chamber arrangement for such a power plant.

An object of the invention is to provide a turbine and combustion chamber with supporting means that permits free expansion of the turbine casing and combustion chamber air jacket during power plant operation.

Another object of the invention is to provide the individual combustion tubes of the combustion chamber, the combustion tube liners and the combustion tube transition tubes with supporting means that permits their free expansion during power plant operation.

Another object of the invention is to provide a combustion chamber in which the air jacket and the combustion tubes are so arranged and supported as to render them accessible for inspection with minimum disassembly from each other and the turbine.

Another object of the invention is to provide a combustion chamber in which the various parts are readily removable for replacement purposes.

Further objects and advantages of the present invention will be apparent from the following description, reference being had to the accompanying drawings wherein a preferred form of the present invention is clearly shown.

In the drawings:

Fig. 8 is a partial side elevation of the turbine and combustion chamber partially broken away to illustrate the internal details of the same.

The apparatus illustrated is particularly designed for that type of power plant wherein a turbine drives a compressor and an electric generator geared thereto, the turbine being supplied with hot gases under pressure from a compressor-fed combustion apparatus and preferably exhausting through a regenerator so as to preheat the air fed to the combustion apparatus. The invention is directly concerned with the combustion chamber and its association with the turbine so only that portion of the power plant is shown.

Figure 1:
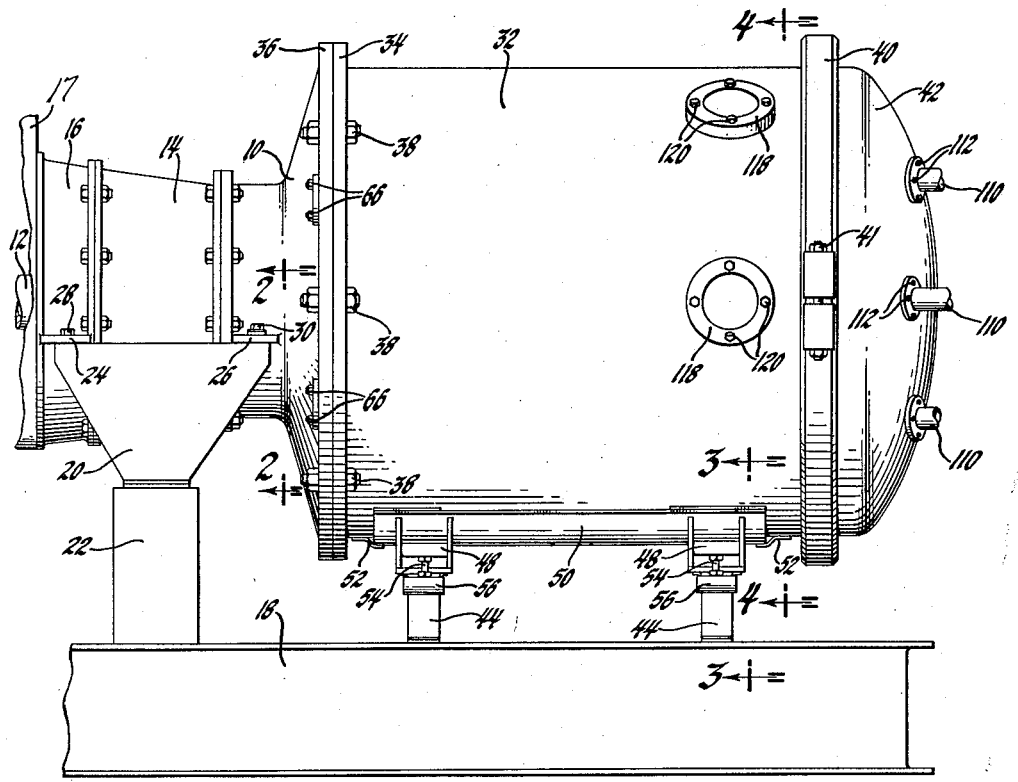
Fig. 1 is a side elevation of the turbine and combustion chamber.
Figure 2:
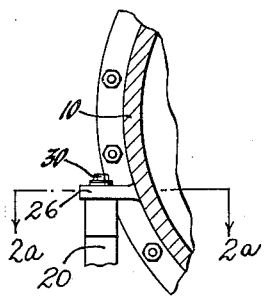
Fig. 2 is an enlarged partial section taken on the plane indicated by the line 2—2 of Fig. 1.

Referring to Figs. 1 and 2, the annular external casing of the turbine is made up of an inlet casing 10 which houses the inlet nozzle of the turbine and an end bearing for the turbine rotor shaft 12, an intermediate casing 14 which houses the bladed portion of the turbine rotor, and an outlet casing 16 which houses the other end bearing of the turbine rotor shaft and which may be utilized to connect the exhaust of the turbine to a regenerator intake casing 17.

The turbine casing is supported on the bed channels 18 of the power plant by a pair of upstanding plates 20 disposed on opposite sides of the casing and suitably fixed to the channel crosspiece 22. Each side of the turbine casing has a spaced pair of lugs 24 and 26 that rest slidably on the respective plates 20. The lugs 24 are fixed against any movement on the plates by a pair of bolts 28 while the lugs 26 are secured on the plates by a pair of bolts 30 that pass through axially elongated slots in the lugs. Accommodation for peripheral expansion of the turbine casing is accomplished by making the plates 20 thin enough to spring in cantilever fashion from the crosspiece 22 while accommodation for axial expansion is accomplished by the elongated slots 25 in the lugs 26.

The air jacket 32 of the combustion chamber and the inlet casing 10 have mating flanges 34 and 36 secured together by bolts 38. The actual support for the air jacket is by spring means to be described; the bolted flange connection between the casing and jacket serves to maintain them in coaxial, pressure-sealed relation. A splitring clamp 40 which may be of conventional configuration bolts at 41 to secure a flanged end cover 42 to the complementally flanged end of the air jacket 32.

Figure 3:
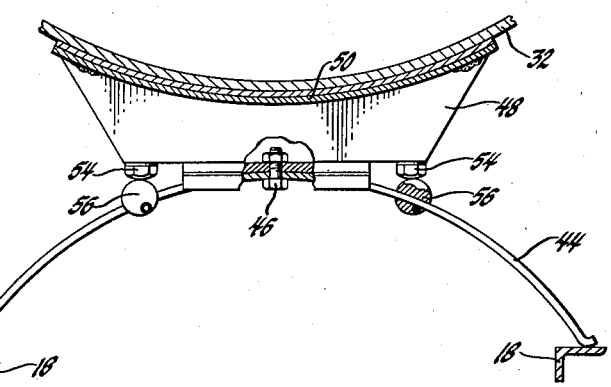
Fig. 3 is an enlarged partial section taken on the plane indicated by the line 3—3 of Fig. 1.
Figure 2A:
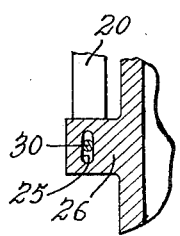
Fig. 2a is a partial section taken on the plane indicated by the line 2a—2a of Fig. 2.

Referring additionally to Fig. 3, a pair of leaf springs 44 are secured by bolts 46 to brackets 48 welded to an arcuate plate 50. The air jacket 32 rests on the plate 50 and is secured thereto only by a pair of end clips 52. The leaf springs 44, by their resiliency, permit free peripheral expansion of the air jacket 32 during power plant operation, and they rest slidably on the bed channels 18 so that the air jacket is free to expand axially. Deflection adjustment of the leaf springs to provide the desired degree of support for the air jacket is accomplished by adjustment of the bolts 54 that thread into brackets 48 and bear against cylindrical 56 suitably fixed to the springs.

Figure 4:
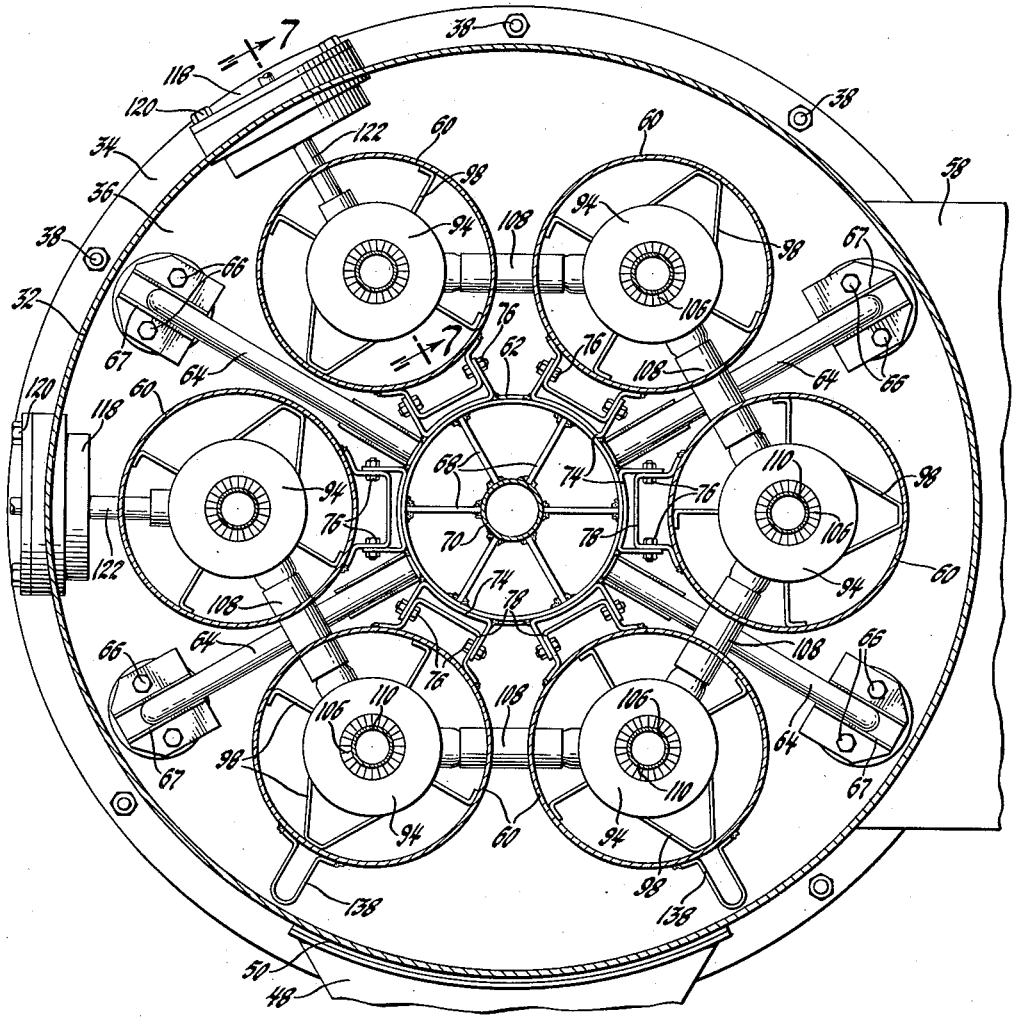
Fig. 4 is an enlarged section taken on the plane indicated by the line 4—4 of Fig. 1.

Referring additionally to Figs. 4 and 8 for the internal arrangement of the combustion chamber, a conduit 58 delivers preheated compressed air from the regenerator 17 for fuel admixture in the combustion tubes 60. The combustion tubes 60 are arranged around a hollow central supporting column 62 in parallel relation with their air inlets facing the end cover 42. The column 62 is supported by four angularly disposed struts 64 welded thereto by gusset plates 65 and fastened to the turbine inlet casing flange 36 inside and free of the air jacket 32 by bolts 66 and gussets 67. A series of radial plates 68 are welded to the inside of the column and to a pilot tube 70 that slidably engages a pin 72 suitably fixed to the end cover 42. Supporting the column 62 on the turbine casing in this manner allows the removal of the air jacket 32 from the turbine casing without the removal of the column and its associated combustion tubes 60.

Figure 6:
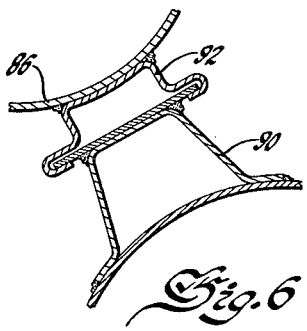
Fig. 6 is an enlarged partial section taken on the plane indicated by the line 6—6 of Fig. 8.
Figure 5:
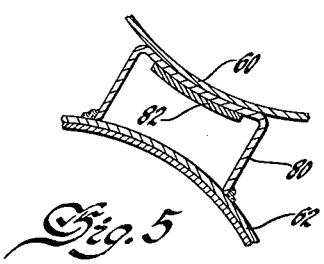
Fig. 5 is an enlarged partial section taken on the plane indicated by the line 5—5 of Fig. 8.

Each combustion tube 60 is supported on the column 62 for free axial and peripheral expansion by a pair of spaced connections. One connection includes a U-shaped bracket 74 welded to the column and secured by bolts 76 to a U-shaped bracket 78 welded to the combustion tube, while the other connection includes a U-shaped bracket 80 (Figs. 5 and 8) welded to the column and slidably engaged in an axial direction by a clip 82 welded to the combustion tube. Each combustion tube 60 discharges to the turbine nozzle 84 through a transition tube 86 pinned to the inlet casing 10 at one end by a bolt 88, and connected to the column 62 at the other end by a U-shaped bracket 90 (Fig. 6) welded to the column and slidably engaged in an axial direction by a U-shaped bracket 92 welded to the transition tube so that the transition tube is free to expand axially and peripherally.

Figure 7:
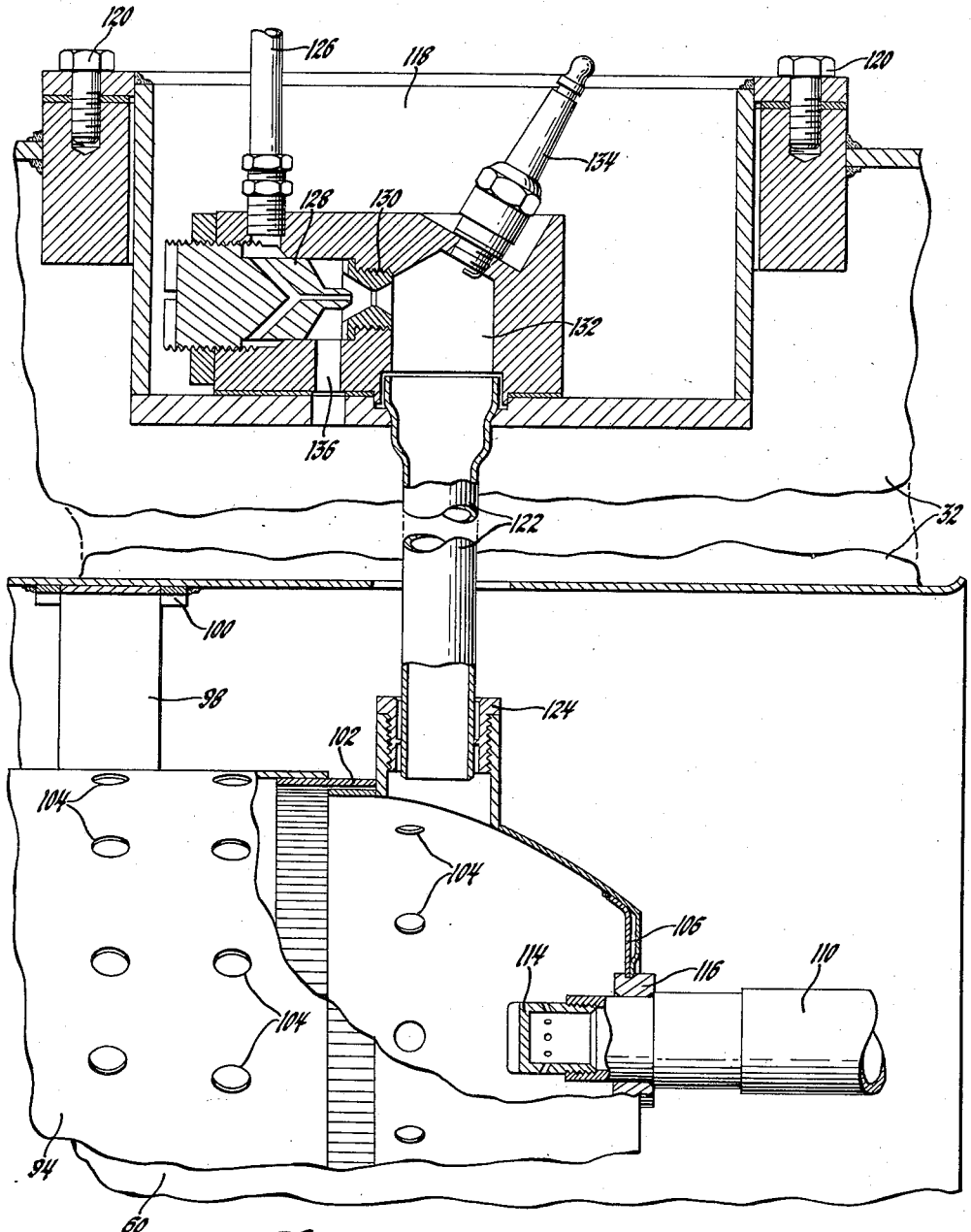
Fig. 7 is an enlarged partial section taken on the plane indicated by the line 7—7 of Fig. 4.

The transition tubes 86 are slidably received by the combustion tubes 60 and the combustion tube liners 94. Each liner 94 is coaxially supported in its combustion tube for free axial and peripheral expansion by two spaced sets of spring legs 96 and 98 that freely engage the inner wall of the combustion tube, the spring legs 98 being fixed against axial movement by spaced strips 100 welded to the combustion tube. The strips 100 extend over a limited portion of the inner periphery of the combustion tube so that the liner may be easily withdrawn by rotating it out of strip engagement. Each liner includes three tubes and an end cap welded together by corrugated rings 102. The liners are provided with perforations 104 and swirler vanes 106 (Fig. 7) that admit air (along with the passages formed by the corrugated rings) to the combustion spaces in the liners. The liners connect with each other by telescopically removable crossover tubes 108 for pressure equalization and are supplied with gaseous fuel by conduits 110 bolted at 112 to the end cover 42. Each conduit 110 carries a fuel nozzle 114 and is slidable in a sleeve 116 carried by the swirler vanes 106 welded in the liner end cap.

Ignition of the fuel air mixture is accomplished by a pair of igniters 118 bolted at 120 to the air jacket 32. The igniters project a flame into two of the liners 94 through the ignition tubes 122 that are slidable in the threaded sleeves 124 of the liner end caps. A gas supply conduit 126 delivers gas through an adjustable nozzle 128 and mixing venturi 130 to the igniter combustion chamber 132 for ignition by a spark plug 134. Main combustion chamber air is admitted to the ignition combustion chamber 132 by a passage 136 in the igniter and variation of the ignition fuel-air ratio to achieve best ignition results is accomplished by axial adjustment of the nozzle 128.

The internal apparatus of the combustion chamber may be subjected to detailed inspection in various manners. Any or all of the combustion tubes 60 or their liners 94 may be removed from the supporting column 62, without removing the air jacket 32 from the turbine inlet casing 10, by removing the end cover 42, the igniters 118, and the crossover tubes 108, and removing the tubes or liners axially from the supporting column. The main fuel conduits 110 may be removed along with the end cover 42 or separately therefrom prior to its removal. Alternately, the air jacket 32 may be removed from the turbine inlet casing 10 without removing the combustion tubes 60 and/or their liners 94 from the supporting column 62 by removing the igniters 118 and removing the air jacket axially from the turbine inlet casing. The end cover 42 may be removed along with the air jacket 32 or separately therefrom prior to its removal.

If desired, the combustion tubes, the liners and the transition tubes may be removed as a unit from the turbine inlet casing by removing therefrom the air jacket, the supporting column, and the transition tube bolts 88. A pair of spaced legs 138 are welded to each of the lowermost combustion tubes 60 to provide support for the removed unit. A great reduction of power plant shutdown and maintenance man-hour time is accomplished by arranging the various elements of the combustion chamber for either single or unitary disassembly in accordance with the invention, and this is accomplished without sacrificing the supporting arrangements of the invention that provide for the necessary free thermal expansion of the various elements.

While the preferred embodiment of the invention has been described fully in order to explain the principles of the invention, it is to be understood that modifications in structure may be made by the exercise of skill in the art within the scope of the invention, which is not to be regarded as limited by the detailed description of the preferred embodiment.

We claim:

1. A gas turbine power plant including a supporting bed, a turbine including an external casing having an inlet end, combustion apparatus including an external air jacket having an outlet end removably secured to the inlet end of the casing, means for supporting the casing on the bed for free axial and peripheral expansion, and means for supporting the jacket for free axial and peripheral expansion comprising springs under the jacket slidably engaging the bed.

2. A gas turbine power plant including a supporting bed, a turbine including an external casing having an inlet end, combustion apparatus including an external air jacket having an outlet end removably secured to the inlet end of the casing, means for supporting the casing for free axial and peripheral expansion including a pair of upwardly extending spring plates having their lower ends secured to the bed and their upper ends secured to the casing at opposite sides thereof, and means for supporting the jacket for free axial and peripheral expansion comprising a pair of deflection adjustable leaf springs under the jacket slidably engaging the bed.

3. A gas turbine power plant including a supporting bed, a turbine including an external casing having an inlet end, combustion apparatus including an external air jacket having an outlet end removably secured to the inlet end of the casing and a plurality of combustion tubes arranged within the jacket, means for supporting the casing on the bed, means for supporting the jacket on the bed, and means for supporting the combustion tubes on the casing so that the jacket may be removed from the casing without removal of the combustion tubes from the casing.

4. A gas turbine power plant including a supporting bed, a turbine including an external casing having an inlet end, combustion apparatus including an external air jacket having an outlet end removably secured to the inlet end of the casing and a plurality of combustion tubes arranged within the jacket with their axes disposed around the axis of the jacket and extending in the same general direction, means for supporting the casing on the bed, means for supporting the jacket on the bed, and means for supporting the combustion tubes on the casing including a central column projecting from the inlet end of the casing so that the jacket may be removed from the casing without removal of the combustion tubes from the casing.

5. A gas turbine power plant including a supporting bed, a turbine including an external casing having an inlet end, combustion apparatus including an external air jacket having an outlet end removably secured to the inlet end of the casing and a plurality of combustion tubes arranged within the jacket, means for supporting the casing on the bed for free axial and peripheral expansion, means for supporting the jacket on the bed for free axial and peripheral expansion, and means for supporting the combustion tubes on the casing so that the jacket may be removed from the casing without removal of the combustion tubes from the casing.

6. A gas turbine power plant including a supporting bed, a turbine including an external casing having an inlet end, combustion apparatus including an external air jacket having an outlet end removably secured to the inlet end of the casing and a plurality of combustion tubes arranged within the jacket with their axes disposed around the axis of the jacket and extending in the same general direction, means for supporting the casing for free axial and peripheral expansion including a pair of upwardly extending spring plates having their lower ends secured to the bed and their upper ends secured to the casing at opposite sides thereof, means for supporting the jacket for free axial and peripheral expansion comprising a pair of deflection adjustable leaf springs under the jacket slidably engaging the bed, and means for supporting the combustion tubes on the casing including a central column projecting from the inlet end of the casing so that the jacket may be removed from the casing without removal of the combustion tubes from the casing.

7. A gas turbine power plant including a supporting bed, a turbine including an external casing having an inlet end, combustion apparatus including an external air jacket having an outlet end removably secured to the inlet end of the casing and a plurality of combustion tubes arranged within the jacket with their axes disposed around the axis of the jacket and extending in the same general direction, means for supporting the casing on the bed for free axial and peripheral expansion, means for supporting the jacket on the bed for free axial and peripheral expansion, a central column secured to the casing for supporting the combustion tubes so that the jacket may be removed from the casing without removal of the combustion tubes from the casing, and means for supporting each combustion tube on the column for free axial and peripheral expansion.

8. A gas turbine power plant including a supporting bed, a turbine including an external casing having an inlet end, combustion apparatus including an external air jacket having an outlet end removably secured to the inlet end of the casing and a plurality of combustion tubes arranged within the jacket with their axes disposed around the axis of the jacket and extending in the same general direction, means for supporting the casing for free axial and peripheral expansion including a pair of upwardly extending spring plates having their lower ends secured to the bed and their upper ends secured to the casing at opposite sides thereof, means for supporting the jacket for free axial and peripheral expansion comprising a pair of deflection adjustable leaf springs under the jacket slidably engaging the bed, a central column for supporting the combustion tubes projecting from the inlet end of the casing and secured thereto by a plurality of angularly disposed struts so that the jacket may be removed from the casing without removal of the combustion tubes from the casing, and spaced means for supporting each combustion tube on the column for free axial and peripheral expansion including a bracket connection and a slidable clip connection.

9. A gas turbine power plant including a supporting bed, a turbine including an external casing having an inlet end, combustion apparatus including an external air jacket supported on the bed and having an outlet end removably secured to the inlet end of the casing and a plurality of combustion tubes arranged within the jacket with their axes disposed around the axis of the jacket and extending in the same general direction, a central column for removably supporting each combustion tube on the column for free axial and peripheral expansion, a removable end cover on the jacket, and a tubular liner in each combustion tube removably supported therein in spaced coaxial relation for free axial and peripheral expansion, the liners being removable on removal of the end cover without removal of the jacket from the casing and without removal of the combustion tubes from the column.

10. A gas turbine power plant including a supporting bed, a turbine including an external casing having an inlet end, combustion apparatus including an external air jacket supported on the bed and having an outlet end removably secured to the inlet end of the casing and a plurality of combustion tubes arranged within the jacket with their axes disposed around the axis of the jacket and extending in the same general direction, a central column for supporting the combustion tubes, means for removably supporting each combustion tube on the column for free axial and peripheral expansion, a removable end cover on the jacket, and a perforated tubular liner in each combustion tube removably supported therein in spaced coaxial relation for free axial and peripheral expansion by two sets of outwardly projecting spring legs secured in axially spaced relation to the liner and engaging the inner wall of the combustion tube, one set of legs being slidably engaged and the other set being fixed against axial movement, the liners being removable on removal of the end cover without removal of the jacket from the casing and without removal of the combustion tubes from the column.

11. A gas turbine power plant including a supporting bed, a turbine including an external casing having an inlet end, combustion apparatus including an external air jacket supported on the bed and having an outlet end removably secured to the inlet end of the casing and a plurality of combustion tubes arranged within the jacket with their axes disposed around the axis of the jacket and extending in the same general direction, a central column for supporting the combustion tubes, means for removably supporting each combustion tube on the column for free axial and peripheral expansion, a removable end cover on the jacket, a tubular liner in each combustion tube removably supported therein in spaced coaxial relation for free axial and peripheral expansion, a transition tube for each combustion tube telescopically connecting the same to the turbine nozzle, and means for supporting each transition tube for free axial and peripheral expansion, the liners being removable on removal of the end cover without removal of the jacket from the casing and without removal of the combustion tubes from the column.

12. A gas turbine power plant including a supporting bed, a turbine including an external casing having an inlet end, combustion apparatus including an external air jacket having an outlet end removably secured to the inlet end of the casing and a plurality of combustion tubes arranged within the jacket with their axes disposed around the axis of the jacket and extending in the same general direction, a central column for supporting the combustion tubes, means for supporting each combustion tube on the column for free axial and peripheral expansion, a perforated tubular liner in each combustion tube supported therein in spaced coaxial relation for free axial and peripheral expansion by two sets of outwardly projecting spring legs secured in axially spaced relation to the liner and engaging the inner wall of the combustion tube, one set of legs being slidably engaged and the other set being fixed against axial movement, a transition tube for each combustion tube telescopically connecting the same to the turbine nozzle, and means for supporting each transition tube for free axial and peripheral expansion including a radially extending pin connection at one end to the inlet end of the casing and a slidable clip connection at the other end to the column.

13. A gas turbine power plant including a supporting bed, a turbine including an external casing having an inlet end, combustion apparatus including an external air jacket having an outlet end removably secured to the inlet end of the casing and a plurality of combustion tubes arranged within the jacket with their axes disposed around the axis of the jacket and extending in the same general direction, a central column for supporting the combustion tubes, spaced means for supporting each combustion tube on the column for free axial and peripheral expansion including a bracket connection and a slidable clip connection, a perforated tubular liner in each combustion tube supported therein in spaced coaxial relation for free axial and peripheral expansion by two sets of outwardly projecting spring legs secured in axially spaced relation to the liner and engaging the inner wall of the combustion tube, one set of legs being slidably engaged and the other set being fixed against axial movement, a transition tube for each combustion tube telescopically connecting the same to the turbine nozzle, and means for supporting each transition tube for free axial and peripheral expansion including a radially extending pin connection at one end to the inlet end of the casing and a slidable clip connection at the other end to the column.

14. A gas turbine power plant including a supporting bed, a turbine including an external casing having an inlet end, combustion apparatus including an external air jacket having an outlet end removably secured to the inlet end of the casing and a plurality of combustion tubes arranged within the jacket with their axes disposed around the axis of the jacket and extending in the same general direction, means for supporting the casing on the bed for free axial and peripheral expansion, means for supporting the jacket on the bed for free axial and peripheral expansion, a central column for supporting the combustion tubes projecting from the inlet end of the casing and secured thereto so that the jacket may be removed from the casing without removal of the combustion tubes from the casing, means for supporting each combustion tube on the column for free axial and peripheral expansion, a perforated tubular liner in each combustion tube supported therein in spaced coaxial relation for free axial and peripheral expansion, a transition tube for each combusiton tube telescopically connecting the same to the turbine nozzle, and means for supporting each transition tube for free axial and peripheral expansion.

15. A gas turbine power plant including a supporting bed, a turbine including an external cylindrical casing having a flanged inlet end, combustion apparatus including an external cylindrical air jacket having a flanged outlet end removably secured to the inlet end of the casing and a plurality of combustion tubes arranged within the jacket with their axes disposed around the axis of the jacket and extending in the same general direction, means for supporting the casing on the bed for free axial and peripheral expansion, means for supporting the jacket for free axial and peripheral expansion comprising a pair of deflection adjustable leaf springs under the jacket slidably engaging the bed, a central column for supporting the combustion tubes free of the jacket projecting from the inlet end of the casing and secured thereto so that the jacket may be removed from the casing without removal of the combustion tubes from the casing, spaced means for removably supporting each combustion tube on the column for free axial and peripheral expansion including a bracket connection end and a slidable clip connection, a perforated tubular liner in each combustion tube removably supported therein in spaced coaxial relation for free axial and peripheral expansion, a transition tube for each combustion tube telescopically connecting the same to the turbine nozzle, and means for removably supporting each transition tube for free axial and peripheral expansion.

16. A gas turbine power plant including a supporting bed, a turbine including an external cylindrical casing having a flanged inlet end, combustion apparatus including an external cylindrical air jacket having a flanged outlet end removably secured to the inlet end of the casing and a plurality of combustion tubes arranged within the jacket with their axes disposed around the axis of the jacket and extending in the same general direction, means for supporting the casing for free axial and peripheral expansion including a pair of upwardly extending spring plates having their lower ends secured to the bed and their upper ends secured to the casing at opposite sides thereof, means for supporting the jacket for free axial and peripheral expansion comprising a pair of deflection adjustable leaf springs under the jacket slidably engaging the bed, a central column for supporting the combustion tubes projecting from the inlet end of the casing and secured thereto by a plurality of angularly disposed struts so that the jacket may be removed from the casing without removal of the combustion tubes from the casing, spaced means for supporting each combustion tube on the column for free axial and peripheral expansion including a bracket connection and a slidable clip connection, a perforated tubular liner in each combustion tube supported therein in spaced coaxial relation for free axial and peripheral expansion by two sets of outwardly projecting spring legs secured in axially spaced relation to the liner and engaging the inner wall of the combustion tube, one set of legs being slidably engaged and the other set being fixed against axial movement, a transition tube for each combustion tube telescopically connecting the same to the turbine nozzle, and means for supporting each transition tube for free axial and peripheral expansion including a radially extending pin connection at one end to the inlet end of the casing and a slidable clip connection at the other end to the column.

References Cited in the file of this patent

UNITED STATES PATENTS

| | | |
|---|---|---|
| 1,491,423 | Rice | Apr. 22, 1924 |
| 2,268,464 | Seippel | Dec. 30, 1941 |
| 2,494,821 | Lombard | Jan. 17, 1950 |
| 2,511,432 | Feilden | June 13, 1950 |
| 2,529,955 | Morley | Nov. 14, 1950 |
| 2,547,619 | Buckland | Apr. 3, 1951 |
| 2,603,064 | Williams | July 15, 1952 |
| 2,609,040 | Aronson | Sept. 2, 1952 |
| 2,609,663 | Newcomb | Sept. 9, 1952 |
| 2,610,467 | Miller | Sept. 16, 1952 |
| 2,614,384 | Feilden | Oct. 21, 1952 |
| 2,615,300 | Lombard | Oct. 28, 1952 |
| 2,632,997 | Howard et al. | Mar. 31, 1953 |